United States Patent [19]

Boukidis

[11] Patent Number: 5,085,681

[45] Date of Patent: Feb. 4, 1992

[54] FERTILIZER MATERIALS BASED ON METALLURGICAL SLAGS AND METHODS OF MAKING THE SAME

[76] Inventor: Nicholas A. Boukidis, 33430 Hunt Club Rd., Libertyville, Ill. 60048

[21] Appl. No.: 295,112

[22] Filed: Jan. 9, 1989

Related U.S. Application Data

[63] Continuation of Ser. No. 14,780, Feb. 13, 1987, abandoned.

[51] Int. Cl.$^5$ ............................. C05C 9/00; C05D 3/04
[52] U.S. Cl. ............................................ 71/29; 71/30; 71/31; 71/49; 71/62; 71/64.12; 71/903
[58] Field of Search ...................... 71/28–30, 71/31, 49, 903, 64.12

[56] References Cited

U.S. PATENT DOCUMENTS 3,303,016  2/1967  Boukidis ................................. 71/62

FOREIGN PATENT DOCUMENTS 0138873  12/1978  Japan ..................................... 71/903

OTHER PUBLICATIONS

"Lexicon" by Nicholas A. Boukidis, pp. 1-5 (1991).
"Blast Furnace Slag in Agriculture" by Colin W. Whittaker, NSA 104-42N, pp. 1-4 (1955).
"Blast-Furnace Slag for Agricultural Use" by H. T. Williams, NSA 104-42A, pp. 3-5 (1946).
"A Comparison of Blast Furnace Slag and Limestone as a Soil Amendment" by G. W. Volk et al., NSA 104-42I, pp. 3-5 (1952).
"Slag, The All Purpose Construction Aggregate" National Slag Association, NSA A.I.A., File No. 3-D-3, pp. 4, 8, 11 (1957).
U.S. Steel News, p. 4 (1958).
"Slag-Iron and Steel" by Judith F. Owens, pp. 1-2 (1988).
U.S. Steel News, pp. 3-4 (1958).
"Processed Blast Furnace Slag—The All Purpose Construction Aggregate" National Slag Association, pp. 5, 9, 14-15 (1960).
"Slag Concrete Masonry Units" National Slag Association, NSA 175-10, pp. 5-6 (1966).
"Slag The All Purpose Construction Aggregate" pp. 1, 5, 22 (1968).
"Slag The All Purpose Construction Aggregate" National Slag Association, NSA 188-1, pp. 3, 5, 10, 14 (1988).
"Slag; Processed Blast Furnace; The All-Purpose Construction Aggregate," National Slag Association, NSA 169-1.
"Expanded Slag" National Slag Association publication NSA 181-14, p. 10.
"Slag; Processed Blast Furnace Slag; The All Purpose Construction Aggregate," National Slag Association; AIA File No. 3-D-3 (1957).
"Slag Concrete Masonry Units," National Slag Association, NSA 175-10 (1975).

*Primary Examiner*—Ferris Lander
*Attorney, Agent, or Firm*—Webb, Burden, Ziesenheim & Webb

[57] ABSTRACT

An agricultural fertilizer material is provided which is resistant to agglomeration, powdering and burning of plant life and which is made up of lightweight blast furnace slag having a water content in the range of about 3% to 5% and mixed with about 10% to 35% by weight of a mixture of nitrogen, phosphoric acid and potash as conventional nutrient salts, said salts and nitrogen being present in amounts sufficient to provide at least 1% by weight of nitrogen on the total mix and said slag having a CaO equivalent of about 20% to 25%.

6 Claims, No Drawings

FERTILIZER MATERIALS BASED ON METALLURGICAL SLAGS AND METHODS OF MAKING THE SAME

This is a continuation of application Ser. No. 014,780, filed on Feb. 13, 1987, and now abandoned.

FIELD OF THE INVENTION

The present fertilizers are based upon a specific type of metallurgical slag (i.e., expanded slag).

The present invention relates to fertilizers based upon metallurgical slags and methods of making such fertilizers and particularly to a fertilizer composition which has high resistance to powdering and agglomeration along with the necessary micronutrients, liming material and soil correctors necessary to provide a complete soil treatment in a single application.

Specifically, for plants to grow vigorously two principal requirements have to be met: proper soil chemistry and soil physics; i.e. complete nutrition and porous aerated soil with proper pH. The invention is based on a composition that is designed to meet these two major requirements in a single application.

It is well known that conventional commercial fertilizer compositions (frequently referred to as NPK compositions) have a tendency to "cake" or to agglomerate and form large lumps which are difficult to crush. On long standing such fertilizers frequently solidify to a solid mass which is very difficult to crush and reduce to fine particles. Such materials cannot be used in ordinary agricultural machinery unless they are in very fine particle form and have little usefulness as agricultural fertilizer once agglomeration has occurred.

Metallurgical slags such as blast furnace slags have, in the past, been recognized as advantageous for use as liming and to an extent fertilizer materials. Depending upon the composition of the slag, such slags may have highly desirable properties for soil sweetening and acid neutralizing as well as soil conditioning. In general, the blast furnace slags have been recognized as having the most acceptable liming properties but at the same time have been recognized as having the most undesirable tendency to agglomerate on storage and to form large and difficult to break up lumps. As a result these blast furnace slags have little usefulness as either a fertilizer or a soil sweetening or conditioning material unless they are crushed or otherwise reduced in particle size. However, when crushed these blast furnace slags also have a problem of dusting or forming a very fine powder which is difficult to control unless wetted. As a result, these materials have little utility as they are produced.

In my earlier U.S. Pat. No. 3,303,016 issued Feb. 7, 1967 I proposed a fertilizing metallurgical slag with agglomeration and powdering resistance preferably using granulated slag, water quenched slag to which I added Vermiculite and diametaceous earth components to assist the flowing characteristic of the material and further aid in completely drying the material. In addition, I provided for the addition of trace materials in a solution with starch, chromate, fungicide and germicide. This solution was sprayed onto the slag along with ammonium compounds, potash and super phosphate in order to provide increased amounts of NPK in the fertilizer. This composition has proven to be superior to most commercial fertilizers of the NPK type as well as superior to blast furnace slags or other metallurgical slags generally. It has, however, suffered from several defects which make it less than completely desirable as a fertilizer, particularly for lawns and gardens and house plants and the like. One of the major problems, particularly for use around lawns and gardens is the fact that the water quenched slag has within it fine glassy slag needles which are virtually impossible to remove and which can get into the hands when handling the material and into the feet if used on the lawn where people walk about in their barefeet. The second disadvantage is that the ammoniated products used in my earlier composition would break down particularly on long standing and release ammonia in storage which was undesirable particularly where the fertilizer was being sold in general stores which also included the sale of foods. Finally, I found that the use of Vermiculite or diametaceous earth created problems particularly if the product was stored for a long period of time.

In response to these problems in conventional NPK slags and in metallurgical slags generally as well as in my own earlier composition for improving metallurgical slags, I have discovered a new composition and method of treating the slag which produces a free flowing, nonagglomerating slag material which is free of all of the problems outlined above in connection with conventional fertilizers, conventional metallurgical slags as well as my own improved product described above.

SUMMARY OF THE INVENTION

I have discovered that a particular type of metallurgical slag, when treated with a mixture of components of urea, phosphoric acid and potassium at relatively high levels under proper conditions, will not aggregate in storage substantially irrespective of the length of time stored as distinguished from either component alone.

I have discovered a unique method of preparing a complete fertilizer product and soil amending product that contains every known nutritional element needed for plant feeding and for correcting soil acidity. More explicitly, the product contains all four of the groups categorized by agricultural agencies as fertilizers, liming materials, micronutrients and soil correctors that improve porosity in clay soils.

I have found particularly that by the use of expanded slag having a moisture content between 3% to 5% I am able to produce products which are free of all of the problems which have plagued the prior art.

DETAILED DESCRIPTION OF THE INVENTION

An understanding of my invention specifically requires familiarity with the terminology of metallurgical slags generally.

Typically, in iron blast furnaces, oxide ores of iron are progressively placed in alternate layers with limestone, dolomite (magnesium bearing limestone) and coke in the blast furnace. Preheated air is blasted into this furnace near the bottom, burning the coke and furnishing the gases and heat necessary to reduce the iron oxide to molten iron metal (pig iron). The iron trickles down over the white hot coke and absorbs an excess of carbon and drains at the bottom as impure high-carbon alloy pig iron. The heat generated in the blast furnace combines the other, non-ferrous minerals, present in the raw materials, into an iron blast furnace slag. Thus, in a continuously operating iron blast furnace, solids are charged at the top, and liquid iron and liquid slag are separately drained or drawn off from the furnace hearth base.

Iron blast furnace slag then becomes one of three different types of slag, depending upon how it is cooled. The three different types are air-cooled blast furnace slag, expanded blast furnace slag and granulated blast furnace slag, also known (and the established usage in the industry) as air-cooled slag, expanded slag and granulated slag, respectively. Air-cooled blast furnace slag as defined in A.S.T.M. C 125 is: "the material resulting from solidification of molten blast furnace slag under atmospheric conditions. Subsequent cooling may be accelerated by application of water to the solidified surface." A.S.T.M. C 125 defines expanded blast-furnace slag as "the lightweight cellular material obtained by controlled processing of molten blast furnace slag with water, or with water and other agents such as steam, or compressed air, or both." According to Bulletin N.S.A. 188-1 of the National Slag Association, page 10, several methods of expanding the slag can be employed, involving the pouring of molten slag in open pits or the use of patented mechanical devices, one of which produces particles in pellet form. A.S.T.M. C 125 defines granulated blast furnace slag as "the glassy, granular material formed when molten blast-furnace slag is rapidly chilled, as by immersion in water." The process by which granulated blast furnace slag is made results in a high porosity material.

The utility of air-cooled and granulated blast furnace slags as fertilizers is discussed, for example, in *Blast Furnace Slag in Agriculture,* National Slag Association Bulletin 104-42 N. As described on page 2 thereof, the processing of slag starts as the molten slag flows from the blast furnace. To produce air-cooled slag, the molten material is simply allowed to flow into slag pits, where it cools slowly in the air. As the slag cools, it crystallizes into a hard, massive solid, and further use of it for agricultural or other purposes requires power shovel excavation of the slag first.

Alternately, as described at page 2 of N.S.A. Bulletin 104-42 N., hot molten slag may be cooled or quenched suddenly by contact with water. The resultant porous product is variously known as granulated, water-granulated or quenched slag. Although both granulated slag and the above-described air-cooled slag are discussed in this bulletin as blast furnace slags having utility in agriculture, it is noteworthy that no mention whatsoever is made of any possible agricultural utility of expanded blast furnace slag. For example, the bulletin states in the first column, page 5, that "granulated slag to be superior in yield-producing ability to either air-cooled slag or dolomitic limestone."

Accordingly, I have found that by the use of expanded slag having a moisture content between 3% to 5% I am able to produce products which are free of all the problems which have plagued the prior art. Inherent in my disclosure of the use of expanded slag is, of course, the understood substantial absence of other slags such as air-cooled slag or granulated slag (water-quenched slag) from my fertilizer materials.

The process of the invention and the fertilizing compositions resulting therefrom can perhaps be best understood by referring to the following examples of certain preferred practices of the invention The following examples describe the use of expanded slag in my invention. I prefer to use expanded slag as compared to air cooled slag because it eliminates the breaking up or crushing operation necessary with air cooled slag and because it combines better with the ingredients added in my process and further it breaks down in the soil more readily than this air cooled slag. Unless air-cooled slag is ground to a fine mesh (below No. 20 U.S. Standard Mesh Size, virtually powder form) it has little utility agriculturally. The expanded slag has lighter density comparable to granular fertilizers and can be used in mesh sizes as high as No. 4, which is critically important for uniform distribution of micronutrients as the product can be spread over a wider surface area. A further critically important advantage of the expanded slag is that it does not yield objectionable fine glassy slag needles, typical of granulated slag, in the final fertilizer product. In my ultimate fertilizer composition I have found that moisture in excess of 5% results in a mix that is too wet and interferes with free flowing in the application of the material. Below 3% the product is subject to undesirable dust formation both in the production and later in the application.

Analysis of suitable expanded blast furnace slags for my purpose fall in the following approximate range:

|  | Percent |
|---|---|
| Silica (SiO$_2$) | About 36–39 |
| Alumina (Al$_2$O$_3$) | About 6–8 |
| Lime (CaO) | About 38–42 |
| Magnesia (MgO) | About 9–12 |
| Sulfur (S) | About 1.2–1.5 |
| Iron (Fe) | About 0.25–0.75 |
| Trace Amounts of oxides of manganese, copper, zinc, boron, sodium, molybdenum and colbalt | about 0.10 |

Preferably, I tailor the particle size of the expanded blast furnace slag with the moisture content reduced to about 3% to 5% by weight depending on the application for which the material is to be used. The sizes and applications are set out in the following table:

| Application | 100% passing through U.S. Std mesh Size |
|---|---|
| Golf Course greens | No. 12 |
| Potted plants | No. 8 |
| Lawns & turf | No. 6 |
| Trees, shrubs, gardens | No. 4 |
| Agricultural ground grade | 83% through No. 20 |
|  | 31% through No. 60 |

The method of drying or reduction to proper particle size is immaterial so long as the specifications for moisture content and sizes are met. The above-described expanded blast furnace slag is an ideal base material for the invention and the examples and references to prepared slag are intended to indicate slag falling within the approximate ranges and standards just described above.

In addition to the non-agglomerating and non-powdering characteristics found upon mixing NPK fertilizer with a properly prepared slag, the expanded slag provided as a base for this invention is additionally an excellent vehicle for adding micronutrients to the composition.

Of course, it is well known that slag itself contains a certain amount of micronutrients and soluble silica as well as other valuable elements and minerals, which the ordinary base or filler materials used in fertilizer compositions contain insignificant amounts or lack altogether.

Applicant has discovered that using the expanded slag as a base for a fertilizer has the advantage of not only providing significant amounts of those elements and minerals so valuable to promoting healthy soil as well as to acid neutralization and the increase of soil porosity by the slag itself and the minimizing of burning effects but also the expanded slag is a superior vehicle for the addition of the micronutrients otherwise insufficiently present or absent in other fertilizers.

In the preparation of the fertilizer material of the present application, the applicant first prepares the expanded with the mesh size as required for a specific use. For example, selecting a lawn and turf preparation, a No. 6 mesh is used to produce a final 8-4-5 NPK fertilizer formula.

The micronutrients core mix is prepared so that the ultimate composition meets the registration requirements of state agricultural agencies. Thus:

| Element | Percent |
| --- | --- |
| Calcium (Ca) | 1.00 |
| Magnesium (Mg) | 0.50 |
| Sulfur (S) | 1.00 |
| Boron (B) | 0.02 |
| Chlorine (Cl) | 0.10 |
| Cobalt (Co) | 0.0005 |
| Copper (Cu) | 0.05 |
| Iron (Fe) | 0.10 |
| Manganese (Mn) | 0.05 |
| Molybdenum (Mo) | 0.0005 |
| Sodium (Na) | 0.10 |
| Zinc (Zn) | 0.05 |

Calcium, magnesium, and iron exist in ample amounts in the expanded slag base itself and need not be included in the core preparation In fact all of the micronutrients listed above as essential to plant life exist to some degree in the expanded slag base. However, to insure that the minimum percentage guarantees are met the following core material is prepared, for example, in the ultimate production of 10 tons of 8-4-5. I am not restricted to the specific composition as there are other choices based on commercially available variations. The 10 ton portion has been selected so as to provide adequate mixable quantities. With the micronutrient amounts being small, it becomes impractical to prepare a core aggregate smaller than that which is listed in the following table. Thus:

| Core Ingredients | |
| --- | --- |
| Copper sulphate | 26 lbs. |
| Zinc sulphate | 25 lbs. |
| Sodium tetraborate | 19 lbs. |
| Manganese dioxide | 16 lbs. |
| Molybdic oxide | 3 oz. |
| Sodium chloride | 40 lbs. |
| Ferrous sulphate | 50 lbs. |
| Cobaltic oxide | 3 oz. |
| Sodium chloride | 40 lbs. |
| Calcium sulphate | 30 lbs. |
| Total | 206 lbs., 6 oz |

To this 206 lbs., 6 oz. aggregate is added 593 lbs., 10 oz. of slag base providing 800 lbs. of a final core aggregate. In this preparation about 2 gallons of water are added to facilitate the uniformity of the mix. The 800 lb. core aggregate is used for the production of 10 tons of final 8-4-5 NPK production at the rate of 80 lbs. per ton.

In the next step, the 80 lb. core aggregate per ton is mixed with 170 lbs. of slag base to extend the distribution of the micronutrients into a 250 lb. premix for making each one ton of 8-4-5 fertilizer production, depending on the size of the ultimate mix. Thus for the 10 ton mix, the 800 lb. core aggregate would be mixed with 1700 lbs. of slag base to extend the same to a 2500 lb. premix for the 10 ton lot of 8-4-5 fertilizer.

The remainder -ingredient components combined with the slag base mix for a one ton mix would vary depending on the commercially available raw materials However, the added components to make one ton of fertilizer according to the invention would be substantially as follows:

| | lbs. |
| --- | --- |
| Urea | 282 |
| Slow release nitrogen (Urea formaldehyde, or other) | 80 |
| Sulphate of potash | 40 |
| Muriate of potash | 132 |
| Triple superphosphate | 174 |
| Core aggregate pre-mix | 250 |
| Slag base | 942 |
| Montmorillonite clay | 100 |
| Total | 2000 lbs. |

The montmorillonite clay is found to be satisfactory in aiding toward uniformity of mix and prevention of a prilling tendency of ingredients if stored under high humidity conditions for over six months. It also aids in the flow characteristics. This ingredient is incorporated in my product as a result of more recent research which shows the advantages of this particular component.

The 8-4-5 formula is a well balanced formula for lawn and turf and plants which will thrive successfully with a higher nitrogen requirement compared with phosphorous and potassium.

The final mixture from the above product provides a guaranteed minimum analysis registrable with state agricultural agencies as follows:

| | |
| --- | --- |
| Nitrogen | 8 |
| Available phosphoric acid | 4 |
| Potash | 5 |
| Calcium | 11 |
| Magnesium | 3 |
| Sulfur | 1 |
| Boron | 0.02 |
| Chlorine | 0.30 |
| Cobalt | 0.0005 |
| Copper | 0.05 |
| Iron | 0.40 |
| Manganese | 0.05 |
| Molybdenum | 0.0005 |
| Sodium | 0.10 |
| Zinc | 0.05 |
| Lime (as CaO equivalent) | 22.0% |

The above final mixture, while it is normally prepared as a blend, can also be prepared in granular form referred to in the trade as "homogenized." I do not present herein the granular-type process. It is known in the fertilizer industry that a blend as illustrated above can be prepared also as a slurry and can be applied either as a blend or as a slurry.

In any, to effect any of the aforementioned processes, for required guaranteed analyses, the ingredients are combined in the same respective proportions. Moreover, the results in plant or crop yield agriculturally are the same whether the application is as a dry blend in slurry form, or granular (homogenized) form.

The above final mixture yields a expanded slag base fertilizer that will not agglomerate or powder, that is readily flowable through a spreader, that minimizes "burning" effects no matter what the season and if spread in reasonable amounts will not burn plant life at all, and finally it is a good soil sweetener and conditioner that contains amounts that meet requirements of state agricultural departments all of the known nutritional elements essential to plant life.

As a second example, I may provide a fertilizer material of the 4-12-4 type This ratio is suitable for vegetable gardens, trees, shrubs, fruit trees, evergreens, flowers and newly seeded laws. This type of fertilizer is non-agglomerating and non-burning and may be formed by admixing:

|  | lbs. |
|---|---|
| Urea | 132 |
| Slow-release nitrogen | 52 |
| Sulphate of potash | 40 |
| Muriate of potash | 100 |
| Triple super phosphate | 524 |
| Core aggregate pre-mix | 250 |
| Slag base | 8.02 |
| Montmorillonite clay | 100 |
| Total | 2000 |

Here again, the final mixture is a good soil sweetener and conditioner which adds the three NPK fertilizer ingredients, the three secondary nutrients calcium, magnesium and sulfur and the nine micronutrients to meet state minimal guaranteed analyses.

As further type examples, depending on the application or on the season, the applicant may provide a 9-3-6 formula especially suitable for golf course greens; a 4-6-4 formula for potted plants; a 5-2-3 formula suitable for turf, preferably, golf course fairways, parks, playgrounds, play fields, that have need primarily for clay soil correction and/or soils that need pH correction.

The varieties of formulations based on this specific slag-base complete nutrient process are virtually without limit.

Any and all elemental components or proportions of soil correcting ingredients can be varied to accommodate particular soils and particular plants.

The foregoing specific examples show preferred practices of this invention. However, the proportions of prepared slag to micronutrients and to NPK fertilizer as well as the ratios of the components of the NPK fertilizer and micronutrients in themselves are limited only by the fact that there must be at least 1% by weight of nitrogen containing compound in order to prevent agglomeration of the slag-base and there must be sufficient slag to meet the fixed percentages of the NPK constituents. The primary considerations in determining proper proportions being the type of soil and the plant life to be grown thereon.

The specific examples above represent final mixtures which applicant believes will be useful in over 80% of the land in the U.S. for most any type of plant life. Similarly, the above type of compositions would be useful in virtually any tillable soil outside of the United States. Applicant wishes to point out, however, that the proportions may be varied as needed for particular conditions.

The proportion of slag-micronutrients mix to NPK may vary as low as 35% of the total weight. Applicant has found that below 35% there is not sufficient calcium present to perform the sweetening process needed in most of the tillable soils and gardens in the U.S. Obviously in the alkaline soil of the dryer parts of the country, this is not a problem, but for most garden areas a final mixture containing less than 35% of the slag-micronutrients mix may not be too satisfactory.

On the other hand, the slag-micronutrients mix could comprise as high as 85% of the total final fertilizer mix but at this point it becomes primarily a liming material and soil corrector and less a fertilizer. It is obvious that where the soil is acid but otherwise rich in plant food products, a mixture with high slag content is desirable. However, for most gardens, I believe that the 55% slag-micronutrients example is a happy medium.

The 8-4-5 NPK formulation likewise may be varied almost without limitation, depending primarily on the plant life to be nurtured.

Obviously if plants requiring more phosphorous are to be grown then the phosphorous component should be increased. However, I believe that the 8-4-5 ratio and the 4-12-4 ratio have the widest applications to the greatest number of lawns and gardens in the U.S. and therefore applicant has used those as the basis for his examples.

In the foregoing specification, I have described certain preferred practices and embodiments of my invention, however it is to be understood this invention may be otherwise practiced within the scope of the following claims.

I claim:

1. An agricultural fertilizer material resistant to agglomeration, powering and burning of plant life comprising expanded blast furnace slag, said slag being substantially free of granulated slag, having a water content in the range about 3% to 5% and mixed with about 10% to 35% by weight of a mixture of nitrogen, phosphoric acid and potash as conventional nutrient salts, said salts and nitrogen being present in amounts sufficient to provide at least 1% by weight of nitrogen on the total mix and said slag having a CaO equivalent of about 20% to 25%.

2. An agricultural fertilizer material as claimed in claim 1 containing at least one micronutrient from the group consisting of magnesium, sulfur, boron, chlorine, cobalt, copper, iron, manganese, molybdenum, sodium and zinc in the range of about 0.0005% to 1%.

3. An agricultural fertilizer material as claimed in claim 1 wherein the nitrogen, phosphoric acid and potash lie in range of proportions between about 1-1-1 to 20-12-20.

4. An agricultural fertilizer material as claimed in claim 1 having the composition; 14.1% urea, 4% urea formaldehyde, 2% sulphate of potash, 6.6% muriate of potash, 8.7% triple superphosphate, 47.1% slag, 5% montmorillonite clay, 12.5% micronutrients.

5. A method of making an agricultural fertilizer material resistant to agglomeration, powdering and burning of plant life comprising the steps of:

(a) preparing a core mixture for one tone of fertilizer of the following composition:

| Copper sulfate | 2.6 lbs. |
|---|---|
| Zinc sulphate | 2.5 lbs. |
| Sodium tetraborate | 1.9 lbs. |
| Manganese dioxide | 1.6 lbs. |
| Molybdic oxide | 0.3 oz. |
| Sodium chloride | 4.0 lbs. |
| Calcium sulfate | 3.0 lbs. |

|   |   |
|---|---|
| Cobaltic oxide | 0.3 oz. |
| Ferrous sulphate | 5.0 lbs. |

(b) admixing said core aggregate to 59.3 lbs. of expanded blast furnace slag, said expanded blast furnace slag being substantially free of granulated slag and further having a water content f about 3% to 5% to form a core aggregate;

(c) admixing said core aggregate with an additional 170 lbs. of expanded blast furnace slag, said expanded blast furnace slag being substantially free of granulated slag and further having a water content of about 3% to 5% to form a core aggregate premix; and (d) adding said core aggregate premix to the following mixture:

|   |   |
|---|---|
| Urea | 282 lbs. |
| Slow release nitrogen compound | 80 lbs. |
| Sulphate of potash | 40 lbs. |
| Muriate of potash | 132 lbs. |
| Triple superphosphate | 174 lbs. |
| Montmorillonite Clay | 100 lbs. |
| Expanded blast furnace slag | 942 lbs. | to form a fertilizer composition.

6. An agricultural fertilizer material resistant to agglomeration, powdering and burning of plant life comprising expanded blast furnace slag, said slag being free of granulated slag, having a water content in the range about 3% to 5% and mixed with about 15% to 20% by weight of a mixture of nitrogen, phosphoric acid and potash as conventional nutrient salts, said salts and nitrogen being present in amounts sufficient to provide at least 1% by weight of nitrogen on the total mix and said slag having a CaO equivalent of about 20% to 25%.

* * * * *

UNITED STATES PATENT AND TRADEMARK OFFICE
CERTIFICATE OF CORRECTION

PATENT NO. : 5,085,681

DATED : February 4, 1992

INVENTOR(S): Nicholas A. Boukidis

It is certified that error appears in the above-identified patent and that said Letters Patent is hereby corrected as shown below:

Column 1 Line 57 "diametaceous" should read --diatomaceous--.

Column 2 Line 16 "diametaceous" should read --diatomaceous--.

Column 3 Line 49 after "slag" insert --[was found]--.

Column 3 Line 62 after "invention" insert --.--.

Column 4 Line 28 "about 0.10" should read --About 0.10--.

Column 5 Line 12 before "with" insert --slag base--.

Column 5 Line 35 after "preparation" insert --.--.

Column 6 Line 9 after "materials" insert --.--.

Column 6 Line 63 after "any" insert --case--.

UNITED STATES PATENT AND TRADEMARK OFFICE
CERTIFICATE OF CORRECTION

PATENT NO. : 5,085,681

DATED : February 4, 1992

INVENTOR(S) : Nicholas A. Boukidis

It is certified that error appears in the above-identified patent and that said Letters Patent is hereby corrected as shown below:

Column 7 Line 11 after "type" insert --.--.

Column 7 Line 23 "8.02" should read --802--.

Claim 5(a) Line 60 Column 8 "tone" should read --ton--.

Claim 5(b) Line 10 Column 9 "f" should read --of--.

Signed and Sealed this

Twenty-fourth Day of August, 1993

Attest:

BRUCE LEHMAN

Attesting Officer

Commissioner of Patents and Trademarks